United States Patent
Mori et al.

(10) Patent No.: US 7,426,159 B2
(45) Date of Patent: Sep. 16, 2008

(54) METHOD OF REPRODUCING OPTICAL DISK AND OPTICAL DISK REPRODUCING APPARATUS

(75) Inventors: Masahiro Mori, Tokyo (JP); Hideo Kobayashi, Tokyo (JP)

(73) Assignee: TDK Corporation, Tokyo (JP)

( * ) Notice: Subject to any disclaimer, the term of this patent is extended or adjusted under 35 U.S.C. 154(b) by 563 days.

(21) Appl. No.: 10/482,315

(22) PCT Filed: Jul. 2, 2002

(86) PCT No.: PCT/JP02/06682
§ 371 (c)(1),
(2), (4) Date: Dec. 30, 2003

(87) PCT Pub. No.: WO03/005351
PCT Pub. Date: Jan. 16, 2003

(65) Prior Publication Data
US 2004/0179450 A1    Sep. 16, 2004

(30) Foreign Application Priority Data
Jul. 3, 2001    (JP) .............................. 2001-202501

(51) Int. Cl.
*G11B 7/00* (2006.01)
(52) U.S. Cl. ............... 369/44.29; 369/44.32; 369/53.28
(58) Field of Classification Search ............... 369/53.37
See application file for complete search history.

(56) References Cited

U.S. PATENT DOCUMENTS 5,903,531 A * 5/1999 Satoh et al. ............... 369/44.29
6,307,820 B2 * 10/2001 Takeya et al. ............. 369/44.29
6,339,571 B1 * 1/2002 Torazawa et al. .......... 369/53.2
6,381,202 B1 * 4/2002 Shimoda .................. 369/47.1
6,411,575 B1 * 6/2002 Akiyama et al. .......... 369/47.52
6,970,638 B1 * 11/2005 Miyagawa ................. 386/46
2001/0008506 A1 * 7/2001 Takeya et al. ............. 369/44.29
2003/0179676 A1 * 9/2003 Ito .......................... 369/53.22

FOREIGN PATENT DOCUMENTS

| JP | 09-282785 | * 10/1977 |
| JP | 9-282785 | 10/1997 |
| JP | 2000-187927 | 7/2000 |
| JP | 2002-170255 | 6/2002 |

OTHER PUBLICATIONS

JP 2002-170255 (translation) Jun. 2002 Inoue Hideo Optical disk device.*

* cited by examiner

Primary Examiner—Wayne Young
Assistant Examiner—Van T. Pham
(74) Attorney, Agent, or Firm—Seed IP Law Group PLLC

(57) ABSTRACT

A method of reproducing an optical disk that that shortens the time between optical disk insertion and implementation of a standby mode enabling reproduction is provided that comprises a step of reading parameters stored in a nonvolatile memory, a step of deciding whether the optical disk can be properly reproduced using the read parameters, a step of, when it is found that the optical disk cannot be properly reproduced using the parameters, conducting a focusing search, reflection level detection, tracking error signal amplitude measurement and the like with respect to the optical disk, a step of specifying new parameters based on the result, and a step of storing the new parameters in the volatile memory.

15 Claims, 4 Drawing Sheets

METHOD OF REPRODUCING OPTICAL DISK AND OPTICAL DISK REPRODUCING APPARATUS

BACKGROUND OF THE INVENTION

The present invention relates to a method of reproducing an optical disk and an optical disk reproducing apparatus, more particularly to a method of reproducing an optical disk and an optical disk reproducing apparatus that shorten the time between optical disk insertion and implementation of a standby mode enabling reproduction.

DESCRIPTION OF THE PRIOR ART

Optical disks, typically CDs and DVDs, are used in large numbers as recording media for recording digital data. Apparatuses for reproducing such optical disks can be classified into two major categories, those of the type that reproduce only a specific kind of optical disk and those of the type that can reproduce multiple kinds of optical disk.

For example, the ordinary CD player can reproduce only CDs and therefore belongs to the former type, while the ordinary DVD player can reproduce both CDs and DVDs and therefore belongs to the latter type.

FIG. 4 is a flow chart schematically showing the sequence of operations conducted in the former type of optical disk reproducing apparatus between optical disk insertion and transition to the standby mode.

As shown in FIG. 4, the optical disk is first inserted into the optical disk reproducing apparatus (step S1), whereafter a control circuit in the apparatus operates a spindle motor to rotate the optical disk and operates an optical head to project a laser beam onto the recording surface of the optical disk (step S2). Next, the focusing of the laser beam is turned on based on a focusing parameter stored in the optical disk reproducing apparatus beforehand (step S3), whereafter the tracking of the laser beam is turned on based on a tracking parameter also stored in the optical disk reproducing apparatus beforehand (step S4). The focusing and tracking parameters are both parameters specific to the type of optical disk (e.g., CD) reproducible by the optical disk reproducing apparatus (e.g., CD player). As a result, the optical disk reproducing apparatus is put in a state that enables reading of data recorded on the optical disk.

Once the laser beam focusing and tracking have been set in this manner, the control circuit in the apparatus conducts initialization consisting of address detection, reading of file management information and the like (step S5), and upon completion of the initialization the apparatus enters the standby mode (step S6). Standby is a state in which the apparatus waits for an instruction from the user, and when the user enters an instruction to reproduce the optical disk, reproduction begins.

However, in the latter type of optical disk reproducing apparatus, i.e., the type of optical disk reproducing apparatus that can reproduce multiple types of optical disks (e.g., a DVD player), a step of discriminating the type of optical disk inserted is required during the sequence of operations conducted between optical disk insertion and transition to standby, because the parameters for turning on the focusing and the tracking differ depending on the type of optical disk inserted (e.g., CD or DVD). In latter type of optical disk reproducing apparatus, therefore, more time is needed between optical disk insertion and transition to standby than in the former type of optical disk reproducing apparatus.

Even in the case where the user mainly uses only a specific type of optical disk (e.g., DVDs) and almost never uses another type of optical disk (e.g., CDs), this step of discriminating the type of optical disk is nevertheless conducted every time an optical disk is inserted, so that under such circumstances, the user is caused particular stress.

In the type of optical disk reproducing apparatus that can reproduce multiple types of optical disks, therefore, a method has been desired that can shorten the time required between optical disk insertion and transition to standby. A need has also been felt for an optical disk reproducing apparatus that can reproduce multiple types of optical disks that is capable of shortening the time required between optical disk insertion and transition to standby.

DISCLOSURE OF THE PRESENT INVENTION

An object of the present invention is therefore to provide a method of reproducing an optical disk that shortens the time between optical disk insertion and implementation of a standby mode enabling reproduction.

Another object of the present invention is to provide an optical disk reproducing apparatus that shortens the time between optical disk insertion and implementation of a standby mode enabling reproduction.

These objects of the present invention are achieved by a method of reproducing an optical disk comprising a step of reading reproducing conditions stored in a nonvolatile memory and a step of deciding whether the optical disk can be properly reproduced using the read reproducing conditions.

In a preferred aspect of the present invention, the method further comprises a step of performing a measurement with respect to the optical disk when it is discriminated that the optical disk cannot be properly reproduced using the reproducing conditions and specifying new reproducing conditions based on the result of the measurement.

In another preferred aspect of the present invention, the method further comprises a step of storing the new reproducing conditions in the nonvolatile memory.

In another preferred aspect of the present invention, the reproducing conditions include at least conditions concerning focusing and conditions concerning tracking.

In another preferred aspect of the present invention, the conditions concerning focusing include at least conditions concerning focusing offset and the conditions concerning tracking include at least conditions concerning tracking offset.

The aforesaid objects of the present invention are also achieved by a method of reproducing an optical disk comprising a first step of performing a measurement with respect to the optical disk to be reproduced and specifying reproducing conditions based on the result of the measurement and a second step of saving the reproducing conditions.

In another preferred aspect of the present invention, the method further comprises a third step of reading the saved reproducing conditions in response to the optical disk being ejected and a next optical disk being inserted.

In another preferred aspect of the present invention, the method further comprises a fourth step of deciding whether the next optical disk can be properly reproduced using the read reproducing conditions and a fifth step of implementing a standby mode without executing the first step when it is decided that proper reproduction is possible.

The aforesaid objects of the present invention are also achieved by an optical disk reproducing apparatus capable of reproducing multiple types of optical disks comprising first means for storing optical disk reproducing conditions, second means for deciding whether an optical disk can be properly reproduced using the reproducing conditions stored in the first means, and third means for discriminating the type of the optical disk when the second means decides that the optical disk cannot be properly reproduced using the reproducing conditions.

In a preferred aspect of the present invention, the apparatus further comprises fourth means for storing in the first means new reproducing conditions matched to the type discriminated by the third means.

DESCRIPTION OF THE PREFERRED EMBODIMENTS

Preferred embodiments of the present invention will now be described in detail with reference to the accompany drawings.

Figure 1:
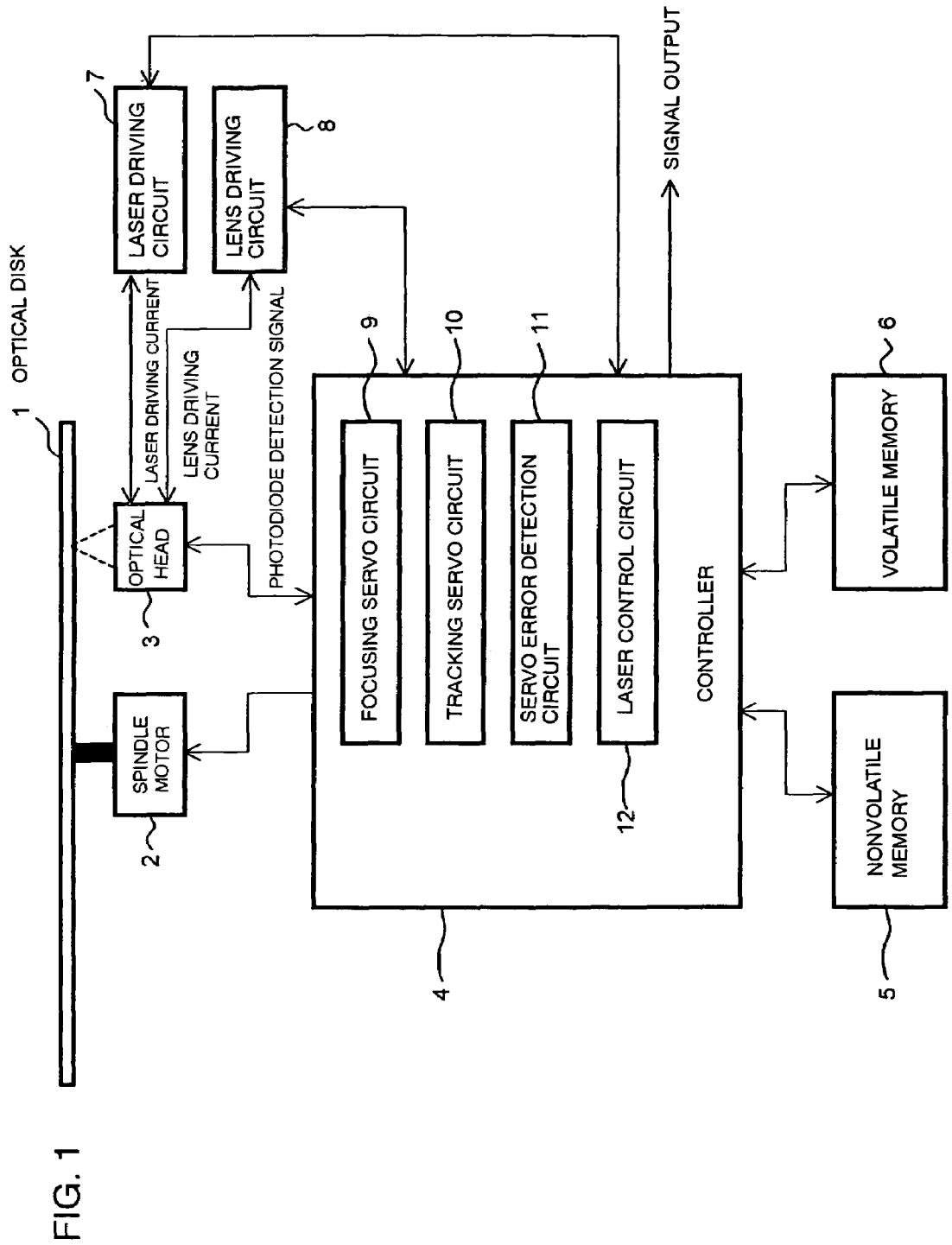
FIG. 1 is a diagram schematically showing the essential portion of an optical disk reproducing apparatus that is a preferred embodiment of the present invention.

FIG. 1 is a diagram schematically showing the essential portion of an optical disk reproducing apparatus that is a preferred embodiment of the present invention.

As shown in FIG. 1, the optical recording apparatus of this embodiment is equipped with a spindle motor 2 for rotating an optical disk 1, an optical head 3 for projecting a laser beam onto the optical disk 1 and receiving light reflected from the optical disk 1, a controller 4 for controlling the operations of the spindle motor 2 and the optical head 3, a nonvolatile memory 5 for storing various parameters, a volatile memory 6 for temporarily storing the parameters and other data, a laser driving circuit 7 for feeding a laser driving current to the optical head 3 and a lens driving circuit 8 for feeding a lens driving current to the optical head 3. Although no limitation is intended, the optical disk reproducing apparatus of this embodiment is a DVD player configured to be capable of reproducing both CDs and DVDs as the optical disk 1. The CDs that can be reproduced by the optical disk reproducing apparatus of this embodiment include not only the read-only CD (CD-ROM) but also the CD-R and CD-RW recorded with reproducible data. Similarly, the DVDs that can be reproduced include not only the read-only DVD (DVD-ROM) but also the DVD-R and DVD-RW recorded with reproducible data. Among these reproducible optical disks 1, the CD-RW and DVD-RW are so-called phase-change disks characterized in having much lower laser beam reflection coefficients than the read-only CD and the like.

The nonvolatile memory 5 must be rewritable and be capable of retaining data even after power cutoff but is not particularly limited as to type. There can, for example, be used a semiconductor memory such as a flash memory, EEPROM or FRAM (ferroelectric memory) or a magnetic recording medium, typically a hard disk, or the like. The volatile memory 6 must be rewritable but is not particularly limited as to type. There can, for example, be used a semiconductor memory such as a DRAM or SRAM. The nonvolatile memory 5 and volatile memory 6 need not be components separate of the controller 4 but can instead be incorporated in the controller 4.

Further, as shown in FIG. 1, the controller 4 includes a focusing servo circuit 9, a tracking servo circuit 10, a servo error detection circuit 11 and a laser control circuit 12. When the focusing servo circuit 9 is activated, the focusing comes into a state of falling on the recording surface of the rotating optical disk 1, and when the tracking servo circuit 10 is activated, the spot of the laser beam comes into an automatic tracking state with respect to the eccentric signal track of the optical disk 1. The servo error detection circuit 11 is a circuit for detecting whether the signals that the optical head 3 inputs to the focusing servo circuit 9 and the tracking servo circuit 10 are within allowable ranges and whether the drive current of the laser driving current supplied by the laser driving circuit 7 and the drive current of the lens driving current supplied by the lens driving circuit 8 exceed prescribed values. The laser control circuit 12 is a circuit for controlling the drive current of the laser driving current supplied by the laser driving circuit 7 so that the laser power always remains constant even if the temperature environment changes.

The focusing servo circuit 9 and the tracking servo circuit 10 are respectively provided with auto-gain control for automatically regulating the focusing gain and auto-gain control for automatically regulating tracking gain.

The focusing servo circuit 9, tracking servo circuit 10, servo error detection circuit 11 and laser control circuit 12 need not be circuits incorporated in the controller 4 but can instead be components separate of the controller 4. Moreover, they do not have to be physical circuits but can instead be accomplished by programs executed in the controller 4.

The method of reproducing an optical disk using the optical disk reproducing apparatus of this embodiment will now be explained.

Figure 2:
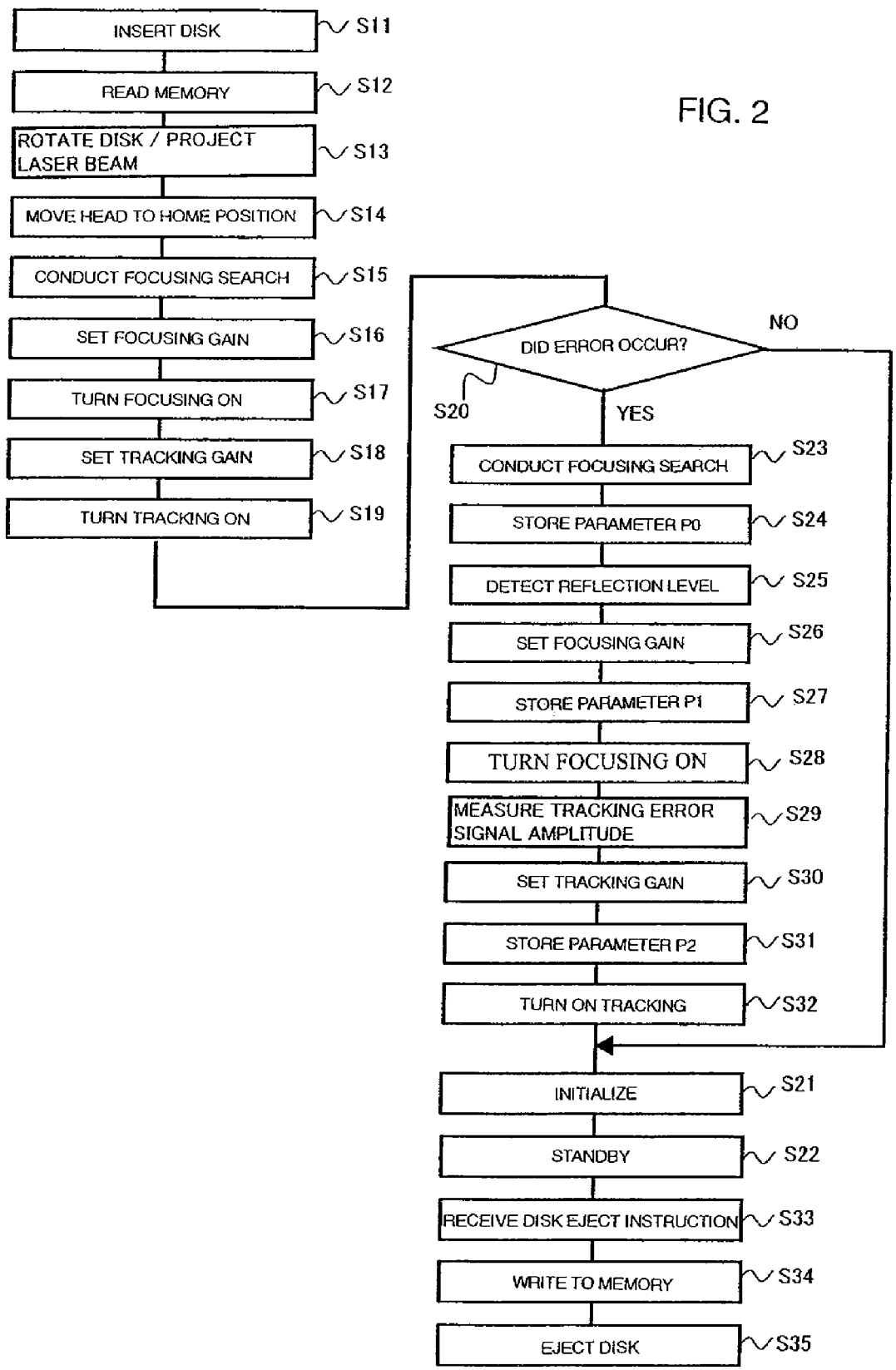
FIG. 2 is a flow chart schematically showing a method of reproducing an optical disk using an optical disk reproducing apparatus, which is a preferred embodiment of the method of the present invention.

FIG. 2 is a flow chart schematically showing a method of reproducing an optical disk using the optical disk reproducing apparatus of this embodiment.

As shown in FIG. 2, at the start the optical disk is inserted into the optical disk reproducing apparatus (step S11), and the controller 4 first reads the various parameters stored in the nonvolatile memory 5 (step S12). The various parameters stored in the nonvolatile memory 5 include a parameter P0 for defining laser wavelength, a parameter P1 for defining focusing gain and a parameter P2 for defining tracking gain. This will be explained in more detail later.

After completing readout of the parameters, the controller 4 drives the spindle motor 2 to rotate the optical disk 1, uses the laser driving circuit 7 to drive the optical head 3, and then, based on the parameter P0 (for defining laser wavelength) among the parameters P0-P2 read in step S12, projects a laser beam having the selected wavelength onto the recording surface of the optical disk 1 (step S13). Two laser beam wavelengths are used in this embodiment, one for CD type optical disks (CD-ROM, CD-R and CD-RW) and the other for DVD type optical disks (DVD-ROM, DVD-R, DVD-RW and DVD-RAM). The former wavelength is about 780 nm and the latter is about 650 nm. The controller 4 next operates the lens driving circuit 8 to move the optical head 3 to home position (step S14).

The controller 4 then conducts a focusing search by which it decides the focusing position (step S15). In the focusing search, the optical head 3 is driven perpendicularly with respect to the recording surface of the optical disk 1 under the control of the lens driving circuit 8, thereby deciding the position of the optical head 3 in the vertical direction.

The controller 4 next sets the focusing gain based on the parameter P1 (for defining focusing gain) among the parameters P0-P2 read in step S12 (step S16). By "focusing gain" is meant the amplification factor of the lens driving circuit 8 for making the laser beam automatically track the recording surface of the optical disk 1 based on a focusing error signal. While other possibilities also exist, in step S16 it is one or the other of a "High" gain and a "Low" gain selected based on the parameter P1. An optical disk 1 that requires the focusing gain to be set to "High" is one of a type having a low coefficient of reflection, namely, a phase-change disk such as a CD-RW, DVD-RW or DVD-RAM. An optical disk 1 that requires the focusing gain to be set to "Low" is one of a type having a high coefficient of reflection, namely, a CD-ROM, DVD-ROM or other such read-only disk manufactured using a stamper having pits formed in advance in accordance with the data to be recorded, or a CD-R, DVD-R or other recordable disk having a dye layer.

After completing the focusing search (step S15) and the setting of the focusing gain (step S16) in this manner, the controller 4 activates the focusing servo circuit 9. That is, it turns the focusing on (step S17). As a result, the focusing comes into a state of falling on the recording surface of the rotating optical disk 1. When the focusing servo circuit 9 is activated, the focusing gain is automatically regulated by the auto-gain control.

Next, the controller 4 sets the tracking gain based on the parameter P2 (for defining tracking gain) among the parameters P0-P2 read in step S12 (step S18). While other possibilities also exist, in step S18 one or the other of a "High" gain and a "Low" gain selected based on the parameter P2. An optical disk 1 that requires the tracking gain to be set to "High" is one of a type having a small tracking error signal amplitude, namely, a DVD-RW in a push-pull or other such ordinary optical detection system. An optical disk 1 that requires the tracking gain to be set to "Low" is one of a type having a large small tracking error signal amplitude, namely, a CD-ROM, CD-R, CD-RW, DVD-ROM, DVD-R, DVD-RAM.

After completing setting of the tracking gain (step S18) in this manner, the controller 4 activates the tracking servo circuit 10. That is, it turns the tracking on (step S19). As a result, the spot of the laser beam comes into an automatic tracking state with respect to the eccentric signal track. When the tracking servo circuit 10 is activated, the tracking gain is automatically regulated by the auto-gain control.

In the course of the aforesaid different setting operations using the parameters P0-P2 read in step S12, the controller 4 keeps the servo error detection circuit 11 constantly active, and the servo error detection circuit 11 decides whether some error has been detected and also decides whether the reading of data from the optical disk 1 can be performed normally (step S20).

When it is found that no error has occurred and that data readout can be performed normally, the controller 4 decides that appropriate focusing and appropriate tracking are being performed and conducts initialization consisting of address detection, reading of file management information and the like (step S21). When this is completed, the standby mode is assumed (step S22). When it is decided in step S20 that appropriate focusing and/or appropriate tracking are not being performed, the controller 4 carries out the series of step explained below.

A decision here that appropriate focusing and appropriate tracking are being conducted means that the parameters P0-P2 read from the nonvolatile memory 5 match the type of the inserted optical disk 1. For instance, if the parameters stored in the nonvolatile memory 5 were ones for a CD-ROM (or CD-R), it means that the inserted optical disk 1 is a CD-ROM (or CD-R). In this case, the controller 4 can read the data stored in the inserted optical disk 1 normally. To the contrary, a decision that appropriate focusing and appropriate tracking are not being conducted means that the parameters P0-P2 read from the nonvolatile memory 5 do not match the type of the inserted optical disk 1. This happens, for instance, in the case where the parameters stored in the nonvolatile memory 5 are ones for a DVD-R and the inserted optical disk 1 is a CD-RW. In this case, the controller 4 cannot read the data stored in the inserted optical disk 1 normally.

When it is decided in step S20 that appropriate focusing and/or appropriate tracking is not being performed, because the servo error detection circuit 11 detected some error or because normal reading of data cannot be performed, the controller 4 repeats the focusing search (step S23). In this focusing search, the optical head 3 is driven perpendicularly to the recording surface of the optical disk 1.

This focusing search is carried out by conducting a focusing search using the currently selected laser wavelength, i.e., using the laser wavelength selected based on the parameter P0, and if a valid photodiode detection signal cannot be obtained from the optical head 3, the focusing search is conducted again at a different laser wavelength. When a valid photodiode detection signal is obtained from the optical head 3 in this manner, digital data representing the laser wavelength used at that time is temporarily stored in the volatile memory 6 as the parameter P0 (step S24).

During this focusing search, the controller 4 detects the reflection level of the optical disk 1 (step S25) and sets the focusing gain (step S26). As explained earlier, some types of the optical disk 1 have a low coefficient of reflection with respect to the laser beam (CD-RW, DVD-RW and DVD-RAM) and other types thereof have a high coefficient of reflection (CD-ROM, CD-R, DVD-ROM AND DVD-R). In the setting of the focusing gain (step S26), an appropriate focusing gain selected based on the reflection level detected in step S25 is set. While other possibilities exist, in step S26, "High" focusing gain is selected if the reflection level detected in step S25 does not exceed a prescribed value and "Low" focusing gain is selected if the reflection level detected in step S25 exceeds the prescribed value. The controller 4 temporarily stores digital data representing the selected and set focusing gain in the volatile memory 6 as the parameter P1 (step S27).

After completing the setting of the focusing gain (step S26) and the storage of the parameter P1 (step S27) in this manner, the controller 4 activates the focusing servo circuit 9. That is, it turns the focusing on (step S28). As a result, the focusing comes into a state of falling on the recording surface of the rotating optical disk 1. When the focusing servo circuit 9 is activated, the focusing gain is automatically regulated by the auto-gain control.

The controller 4 then measures the tracking error signal amplitude (step S29) and sets the tracking gain (step S30). As explained earlier, some types of the optical disk 1 have a small tracking error signal amplitude and other types have a large tracking error signal amplitude. In this setting of the tracking gain (step S30) an appropriate tracking gain selected based on the tracking error signal amplitude measured in step S29 is set. While other possibilities exist, in step S30, "High" tracking gain is selected if the tracking error signal amplitude detected in step S29 does not exceed a prescribed value and "Low" tracking gain is selected if the tracking error signal amplitude detected in step S29 exceeds the prescribed value. The controller 4 temporarily stores digital data representing the selected and set tracking gain in the volatile memory 6 as the parameter P2 (step S31).

After completing setting of the tracking gain (step S30) and storage of the parameter P2 (step S31) in this manner, the controller 4 activates the tracking servo circuit 10. That is, it turns the tracking on (step S32). As a result, the spot of the laser beam comes into an automatic tracking state with respect to the eccentric signal track. As explained earlier, when the tracking servo circuit 10 is activated, the tracking gain is automatically regulated by the auto-gain control.

When activation of the focusing servo circuit 9 and the tracking servo circuit 10 have been completed in the foregoing manner, the controller 4 conducts the aforesaid initialization (step S21). When this is completed, the standby mode is assumed (step S22). As was mentioned above, standby is a state in which the apparatus waits for an instruction from the user, and when the user enters an instruction to reproduce the optical disk, reproduction begins.

When the user enters an instruction to eject the optical disk 1 (step S33), the controller 4 reads the parameters P0-P2 stored in the volatile memory 6 and writes them to the nonvolatile memory 5 (step S34), whereafter the optical disk 1 is ejected (step S35). However, when the parameters P0-P2 are not contained in the volatile memory 6, i.e., when it was decided in step S20 that appropriate focusing and appropriate tracking were being performed, the writing to the nonvolatile memory 5 (step S34) is skipped.

As a result of the foregoing, parameters P0-P2 matched to the type of optical disk 1 most recently reproduced are stored in the nonvolatile memory 5. If the same type of optical disk 1 is next reproduced, therefore, the parameters P0-P2 stored in the nonvolatile memory 5 can be used (the steps S23 to S32 can be skipped) to rapidly establish the standby mode. Of particular note is that in a situation where the user mainly uses only a specific type of optical disk 1 and almost never uses another type of optical disk, the stress experienced by the user is minimized because the steps S23 to S32 are almost always skipped.

Thus, owing to the fact that parameters P0-P2 matched to the most recently reproduced optical disk 1 are stored in the nonvolatile memory 5 in this embodiment, the time between insertion of an optical disk 1 and transition to the standby mode enabling reproduction can be shortened.

Another preferred embodiment of the present invention will now be explained.

This embodiment represents an example of applying the present invention to an optical disk recording/reproducing apparatus capable not only of reproducing an optical disk 1 but also of performing data recording with respect to an optical disk 1. The optical disk recording/reproducing apparatus of this embodiment is configured similarly to the optical disk reproducing apparatus shown in FIG. 1 but it differs from the optical disk reproducing apparatus of the preceding embodiment in the point that the focusing-related settings and tracking-related settings are conducted more rigorously in order to achieve accurate recording of data on the optical disk 1. Note that in this embodiment the laser control circuit 12 controls the drive current of the laser driving current during reproduction so that, as mentioned earlier, the laser power always remains constant even if the temperature environment changes and controls the drive current of the laser driving current during recording so as to produce laser pulses suitable for the disk properties.

The method of optical disk recording/reproducing using an optical disk recording/reproducing apparatus of this embodiment will now be explained.

Figure 3:
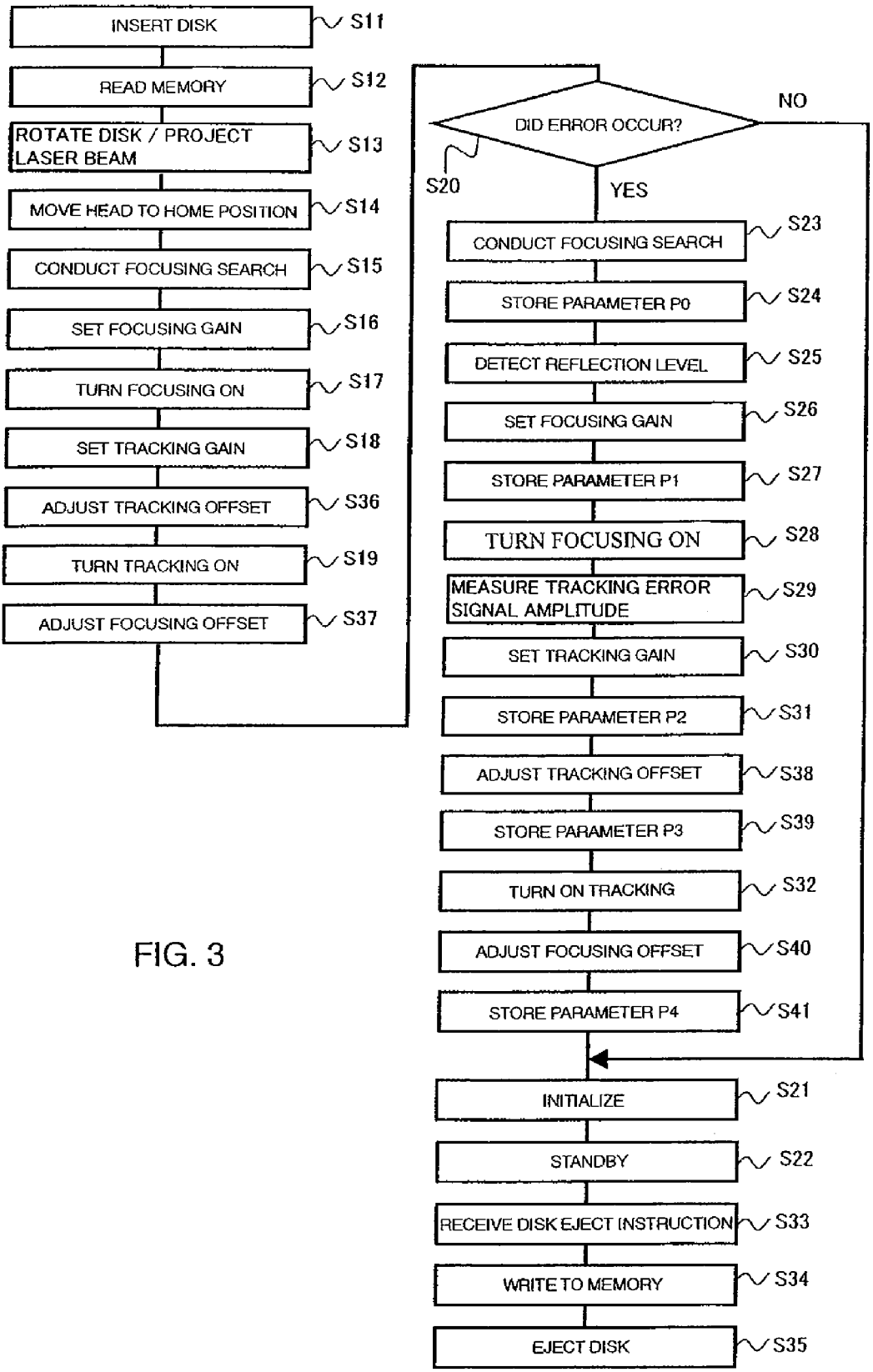
FIG. 3 is a flow chart schematically showing a method of recording/reproducing an optical disk using an optical disk recording/reproducing apparatus, which is another preferred embodiment of the method of the present invention.
Figure 4:
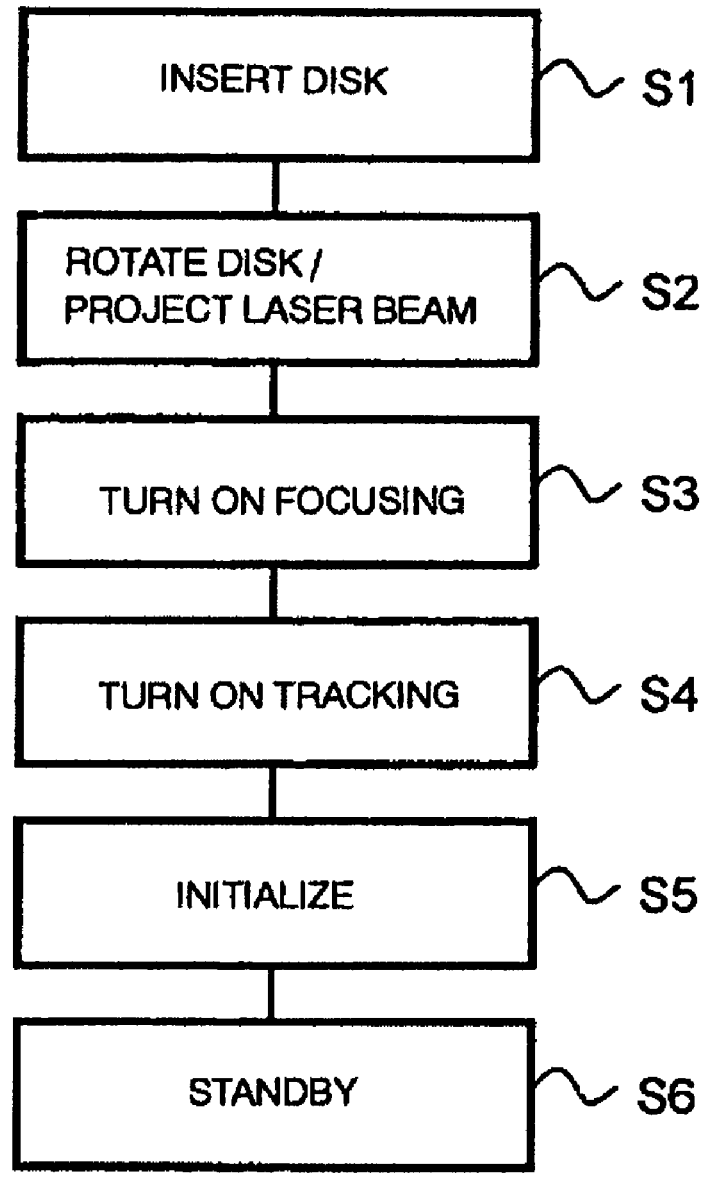
FIG. 4 is a flow chart schematically showing the sequence of operations conducted in a conventional optical disk reproducing apparatus between optical disk insertion and implementation of a standby mode.

FIG. 3 is a flow chart schematically showing the method of recording/reproducing an optical disk using an optical disk recording/reproducing apparatus in accordance with this embodiment Steps in FIG. 3 that are the same as those shown in FIG. 2 are assigned the same reference symbols as those in FIG. 2.

As shown in FIG. 3, at the start the optical disk is inserted into the optical disk reproducing apparatus (step S11), and the controller 4 first reads the various parameters stored in the nonvolatile memory 5 (step S12). In this embodiment, the various parameters stored in the nonvolatile memory 5 include not only a parameter P0 for defining laser wavelength, a parameter P1 for defining focusing gain and a parameter P2 for defining tracking gain, but also a parameter P3 for defining amount of tracking offset and a parameter P4 for defining amount of focusing offset.

After completing readout of the parameters, the controller 4 drives the spindle motor 2 to rotate the optical disk 1, drives the optical head 3, and then, based on the parameter P0 (for defining laser wavelength) among the parameters P0-P4 read in step S12, projects a laser beam having the selected wavelength onto the recording surface of the optical disk 1 (step S13). The controller 4 next operates the lens driving circuit 8 to move the optical head 3 to home position (step S14).

Next, as in the preceding embodiment, the controller 4 conducts a focusing search (step S15), sets the focusing gain based on the parameter P1 for defining focusing gain (step S16), and activates the focusing servo circuit 9. That is, it turns the focusing on (step S17). As a result, the focusing comes into a state of falling on the recording surface of the rotating optical disk 1 and the focusing gain is automatically regulated by the auto-gain control.

Then, as in the preceding embodiment, the controller 4 sets the tracking gain based on the parameter P2 for defining tracking gain (step S18).

After completing setting of the tracking gain (step S18) in this manner, the controller 4 adjusts the tracking offset based on the parameter P3 (for defining amount of tracking offset) among the parameters P0-P4 read in step S12 (step S36).

Then the controller 4 activates the tracking servo circuit 10. That is, it turns the tracking on (step S19). As a result, the spot of the laser beam comes into an automatic tracking state with respect to the eccentric signal track and the tracking gain is automatically regulated by the auto-gain control.

Further, the controller 4 adjusts the focusing offset based on based on the parameter P4 (for defining amount of focusing offset) among the parameters P0-P4 read in step S12 (step S37).

In the course of the aforesaid different setting operations using the parameters P0-P4 read in step S12, the controller 4 keeps the servo error detection circuit 11 constantly active as in the preceding embodiment, and the servo error detection circuit 11 decides whether some error has been detected and also decides whether the reading of data from the optical disk 1 can be performed normally (step S20).

When it is found that no error has occurred and that data readout can be performed normally, the controller 4 decides that appropriate focusing and appropriate tracking are being performed and conducts initialization consisting of address detection, reading of file management information and the like (step S21). When this is completed, the standby mode is assumed (step S22). When it is decided in step S20 that appropriate focusing and/or appropriate tracking are not being performed, the controller 4 carries out the series of step explained below.

When it is decided in step S20 that appropriate focusing and/or appropriate tracking is not being performed, because the servo error detection circuit 11 detected some error or because normal reading of data cannot be performed, the controller 4, as in the preceding embodiment, conducts another focusing search (step S23), stores the parameter P0 (step S24), detects the reflection level (step S25), sets the focusing gain (step S26), and stores the parameter P1 (step S27), whereafter it activates the focusing servo circuit 9. That is, it turns the focusing on (step S28). As a result, the focusing comes into a state of falling on the recording surface of the rotating optical disk 1.

As in the preceding embodiment, the controller 4 then measures the tracking error signal amplitude (step S29) and sets the tracking gain (step S30). Also as in the preceding embodiment, the controller 4 at this point temporarily stores digital data representing the tracking gain selected by tracking gain setting (step S30) in the volatile memory 6 as the parameter P2 (step S31).

After completing setting of the tracking gain (step S30) and storage of the parameter P2 (step S31) in this manner, the controller 4 internally regulates the direct current (DC) component of the tracking error signal electrically so that the direct current component contained in the tracking error becomes 0 V. That is, it adjusts the tracking offset (step S38). Moreover, the controller 4 temporarily stores digital data representing the amount of offset required for the tracking offset adjustment in the volatile memory 6 as the parameter P3 (step S39).

After completing the tracking offset adjustment (step S38) and the storage of the parameter P3 (step S39), the controller 4 activates the tracking servo circuit 10. That is, it turns the tracking on (step S32). As a result, the spot of the laser beam comes into an automatic tracking state with respect to the eccentric signal track. In this case, since the tracking offset was adjusted in step S38, the laser beam spot traces substantially the center of the signal track.

After completing the tracking-related setting/adjustment in the foregoing manner, the controller 4 internally imparts offset current to the focusing servo signal so as to optimize jitter and error rate as reproduction quality factors, thereby electrically regulating the focusing servo signal. That is, it adjusts the focusing offset (step S40). Moreover, the controller 4 temporarily stores digital data representing the amount of offset required for the focusing offset adjustment in the volatile memory 6 as the parameter P4 (step S41).

Next, as in the preceding embodiment, the aforesaid initialization (step S21) is conducted, whereafter the standby mode is assumed (step S22). As was mentioned above, standby is a state in which the apparatus waits for an instruction from the user. When the user enters an instruction to reproduce the optical disk, reproduction begins, and when the user enters an instruction to record to the optical disk 1, recording begins. In recording to the optical disk 1, it is ordinarily necessary to set and regulate the focusing and tracking with high accuracy. In this embodiment, the focusing and tracking are very accurately set and regulated owing to the fact that tracking offset (step S36, step S38) and focusing offset adjustment (step S37, S40) are carried out.

When the user enters an instruction to eject the optical disk 1 (step S33), the controller 4 reads the parameters P0-P4 stored in the volatile memory 6 and writes them to the nonvolatile memory 5 (step S34), whereafter the optical disk 1 is ejected (step S35). However, when the parameters P0-P4 are not contained in the volatile memory 6, i.e., when it was decided in step S20 that appropriate focusing and appropriate tracking were being performed, the writing to the nonvolatile memory 5 (step S34) is skipped.

As a result of the foregoing, similarly to in the preceding embodiment, parameters P0-P4 matched to the type of optical disk 1 most recently reproduced are stored in the nonvolatile memory 5. If the same type of optical disk 1 is next reproduced, therefore, the parameters P0-P4 stored in the nonvolatile memory 5 can be used (the steps S23 to S32 and steps S38 to S41 can be skipped) to rapidly establish the standby mode. A particular point worth noting is that, in comparison with a read-only apparatus that cannot record, an optical disk recording/reproducing apparatus requires a larger number of setting/regulation steps to be conducted after an optical disk 1 is inserted, so that more time is ordinarily need to reach the standby mode. In the present embodiment, however, the standby mode can be rapidly established when again using an optical disk of the same type as the optical disk 1 most recently used, because parameters P0-P4 required for the settings and regulation are stored in the nonvolatile memory 5.

The present invention has thus been shown and described with reference to specific embodiments. However, it should be noted that the present invention is in no way limited to the details of the described arrangements but changes and modifications may be made without departing from the scope of the appended claims.

For example, in the above-described embodiments, parameters are written to the nonvolatile memory 5 between the time that the user enters an instructions to eject the optical disk 1 (step S33) and the time that the optical disk 1 is actually ejected (S35). However, the writing of the parameters to the nonvolatile memory 5 is not limited to this period and can, for example, be conducted during standby (step S22) or be conducted during reproduction (recording) of the optical disk 1. Moreover, it can be conducted after or during the ejection of the optical disk 1 (step S35) or be conducted during initialization (step S21).

In the foregoing embodiments, the generated parameters are once stored in the volatile memory 6 and later stored in the nonvolatile memory 5. However, it is instead possible to store each parameter in the nonvolatile memory 5 as it is generated.

In the foregoing embodiments, the parameters are read from the nonvolatile memory 5 between the time that the optical disk 1 is inserted (step S11) and the time that the optical disk 1 is rotated and the laser beam is projected thereon (step S13). However, the reading of the parameters from the nonvolatile memory 5 is not limited to this period and can be conducted anytime before the focusing gain is decided (step S16). The reading of the parameters can therefore be conducted before insertion of the optical disk 1.

The parameters stored in the nonvolatile memory 5 in the foregoing embodiments are only one example of the parameters to be stored in the present invention and it is possible to store only some of them in the nonvolatile memory 5 or to also store other parameters in the nonvolatile memory 5.

In step S23 of the foregoing embodiments, a focusing search is conducted using the currently selected laser wavelength, i.e., using the laser wavelength selected based on the parameter P0. However, in step S23 it is instead possible to select and conduct the focusing search using a specific laser wavelength (such as 780 nm) unrelated to the currently selected laser wavelength.

In step S12 of the foregoing embodiments, parameters stored in the nonvolatile memory 5 are read. In a case where a next optical disk 1 is inserted following the ejection of the preceding optical disk 1 without cutting off the power, the readout from memory in step S12 can be readout from the volatile memory 6.

Further, in this specification and the appended claims, the respective means need not necessarily be physical means and arrangements whereby the functions of the respective means are accomplished by software fall within the scope of the present invention. In addition, the function of a single means may be accomplished by two or more physical means and the functions of two or more means may be accomplished by a single physical means.

As explained in the foregoing, the present invention provides a method of reproducing an optical disk and an optical disk reproducing apparatus that that shorten the time between optical disk insertion and implementation of a standby mode enabling reproduction.

The invention claimed is:

1. A method of reproducing an optical disk, comprising:
reading a reproducing condition last stored in a nonvolatile memory, the read reproducing condition corresponding to one of the reproducing conditions of a plurality of kinds of optical disks;
deciding whether the optical disk can be properly reproduced using the read reproducing condition;
performing a measurement with respect to the optical disk in response to deciding that the optical disk cannot be properly reproduced using the read reproducing condition;
specifying a new reproducing condition based on the measurement; and
storing the new reproducing condition in the nonvolatile memory.

2. The method of claim 1, further comprising:
reading the stored new reproducing condition in response to presence of a next optical disk.

3. The method of claim 1, further comprising:
ejecting the optical disk;
inserting a next optical disk; and
reading the stored new reproducing condition in response to inserting the next optical disk.

4. The method of claim 1 wherein specifying the new reproducing condition comprises:
specifying a laser wavelength.

5. The method of claim 1 wherein specifying the new reproducing condition comprises:
specifying a focusing gain.

6. The method of claim 1 wherein specifying the new reproducing condition comprises:
specifying a focusing offset.

7. The method of claim 1 wherein specifying the new reproducing condition comprises:
specifying a tracking gain.

8. The method of claim 1 wherein specifying the new reproducing condition comprises:
specifying a tracking offset.

9. An optical disk reproducing apparatus capable of reproducing multiple types of optical disks comprising:
a means for storing optical disk reproducing conditions of the multiple types of optical disks;
a means for reading a reproducing condition last stored in the means for storing;
means for deciding whether an optical disk can be properly reproduced using the read reproducing condition;
a means for performing a measurement with respect to the optical disk in response to deciding that the optical disk cannot be properly reproduced using the read reproducing condition;
a means for specifying a new reproducing condition based on the measurement; and
a means for storing the new reproducing condition.

10. The optical disk reproducing apparatus of claim 9 wherein the new reproducing condition is a laser wavelength.

11. The optical disk reproducing apparatus of claim 9 wherein the new reproducing condition is a focusing gain.

12. The optical disk reproducing apparatus of claim 9 wherein the new reproducing condition is a focusing offset.

13. The optical disk reproducing apparatus of claim 9 wherein the new reproducing condition is a tracking gain.

14. The optical disk reproducing apparatus of claim 9 wherein the new reproducing condition is a tracking offset.

15. The optical disk reproducing apparatus of claim 9 wherein the means for storing the new reproducing condition stores the new reproducing condition into the means for storing optical disk reproducing conditions.

* * * * *